June 3, 1941.　　　A. M. ARRIZABALA　　　2,244,441
MOTOR VEHICLE DOOR LOCK
Filed June 16, 1939　　　3 Sheets-Sheet 1
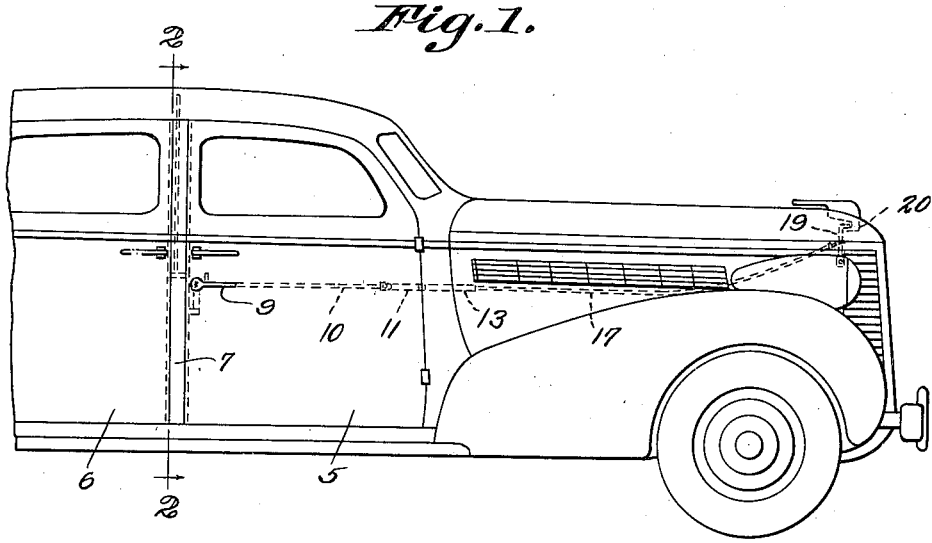
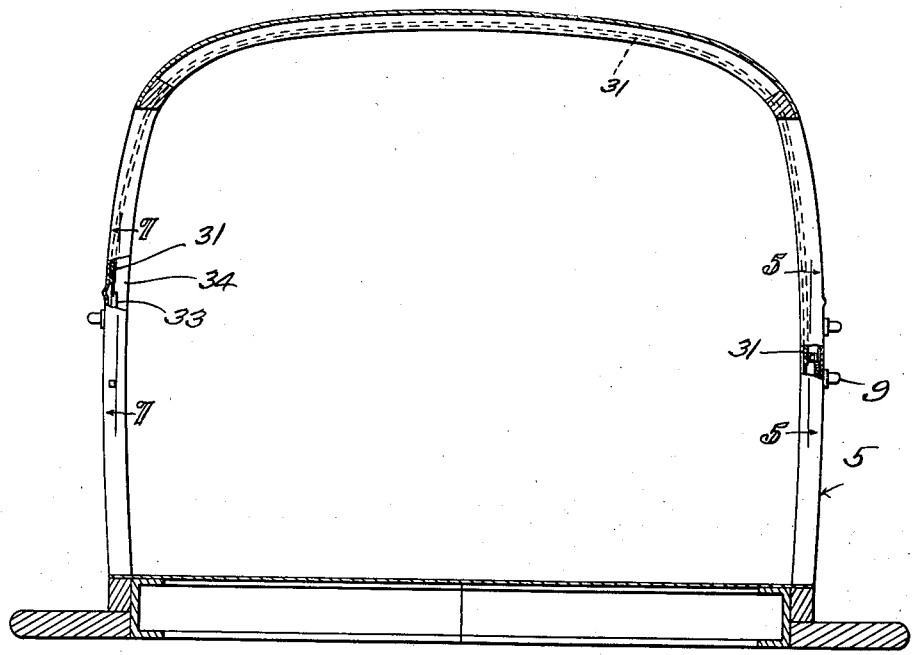
AUGUSTIN M. ARRIZABALA
INVENTOR.
BY *CA Snow & Co.*
ATTORNEYS.

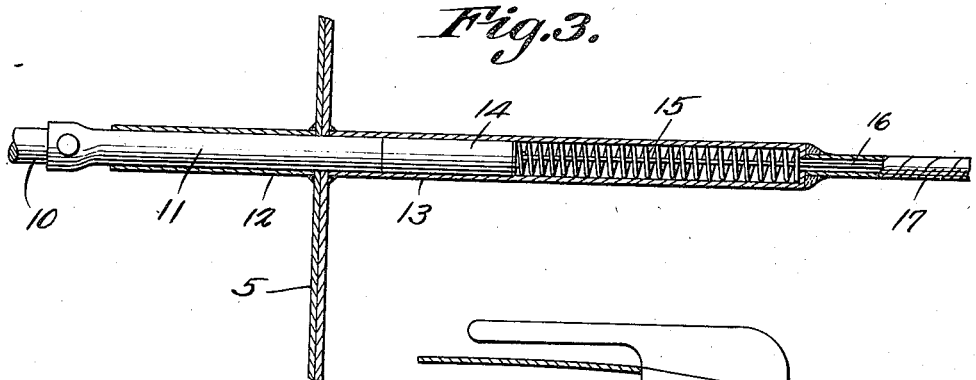
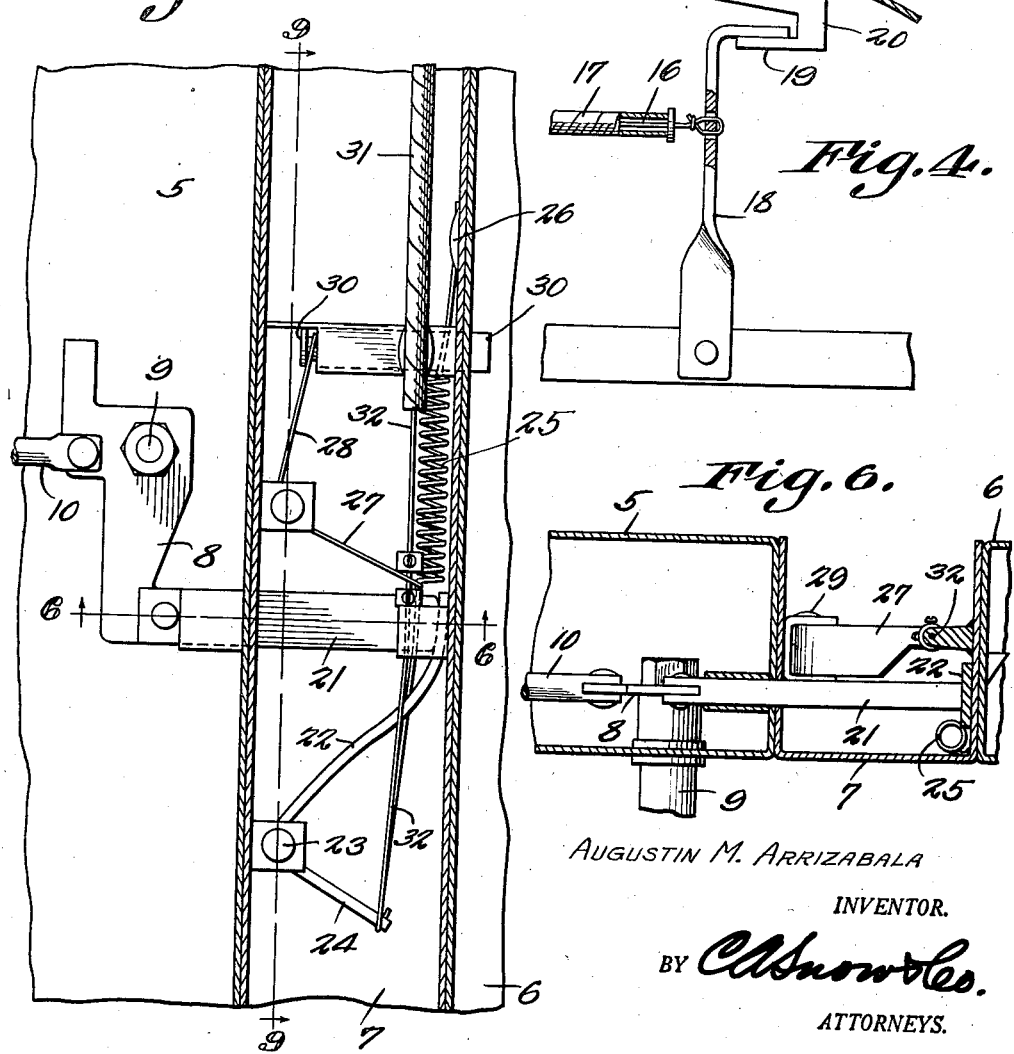

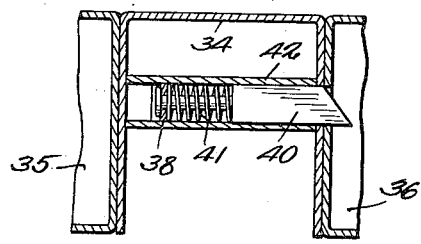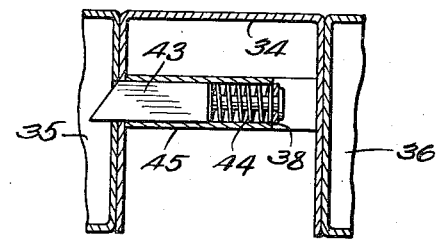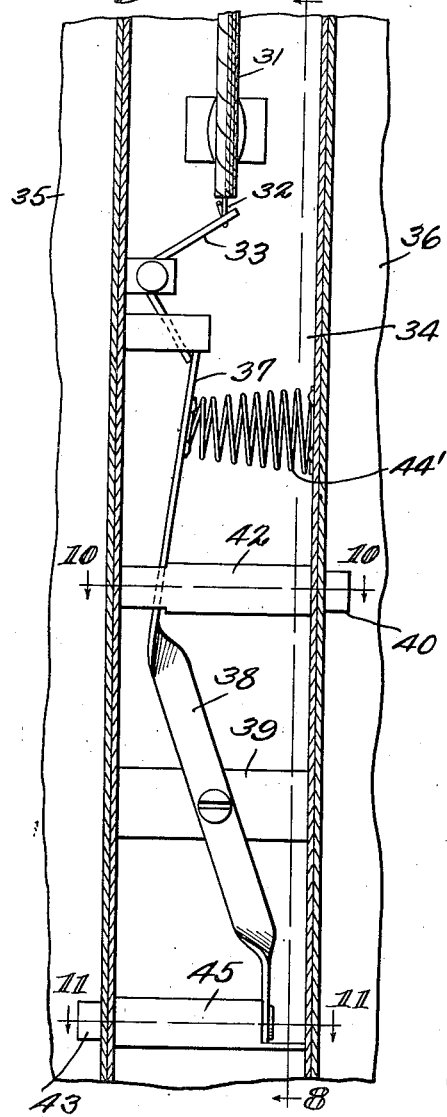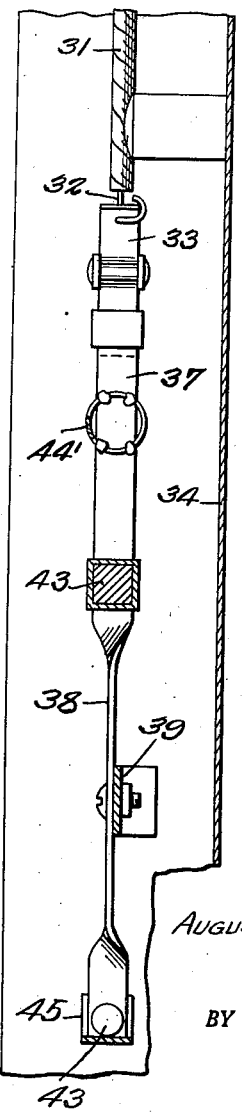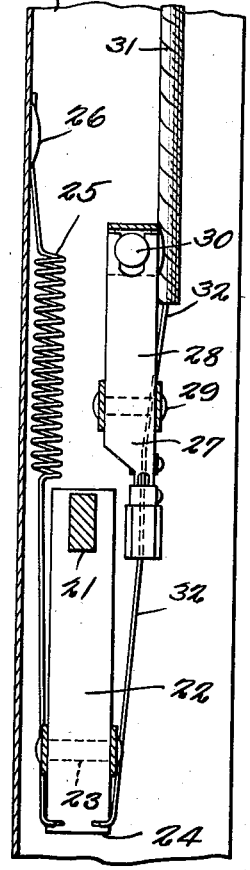

Patented June 3, 1941

2,244,441

UNITED STATES PATENT OFFICE 2,244,441

MOTOR VEHICLE DOOR LOCK

Augustin M. Arrizabala, Emmett, Idaho

Application June 16, 1939, Serial No. 279,539

1 Claim. (Cl. 70—264)

This invention relates to motor vehicle door locks, the primary object of the invention being to provide means whereby the various sliding bolts of the door locks of a motor vehicle may be simultaneously controlled by a master lock, to the end that it is only necessary to lock a single door in locking the closures or doors of the vehicle.

An important object of the invention is to provide means whereby the motor vehicle hood will be also locked in its closed position, simultaneously. with the operation of the sliding bolts of the door lock to lock the doors of the vehicle.

Another important object of the invention is to provide means for locking the right front door, or the door of the motor vehicle carrying the master lock, to insure against opening the door carrying the master lock to gain access to the lock control mechanism by removing the door hinge pins.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view illustrating the front end of a motor vehicle, equipped with a door locking mechanism, constructed in accordance with the invention.

Figure 2 is a sectional view taken on line 2—2 of Figure 1.

Figure 3 is a fragmental sectional view illustrating the means for locking a door to prevent the removal of the door by removing the hinge pins.

Figure 4 is a fragmental detail view illustrating the means for locking the hood in its closed position.

Figure 5 is a sectional view taken on line 5—5 of Figure 2.

Figure 6 is a sectional view taken on line 6—6 of Figure 5.

Figure 7 is a sectional view taken on line 7—7 of Figure 2.

Figure 8 is a sectional view taken on line 8—8 of Figure 7.

Figure 9 is a fragmental sectional view taken on line 9—9 of Figure 5.

Figure 10 is a sectional view taken on line 10—10 of Figure 7.

Figure 11 is a sectional view taken on line 11—11 of Figure 7.

Referring to the drawings in detail, the reference character 5 designates the front right door of a motor vehicle, the rear right door being indicated by the reference character 6. These doors 5 and 6 move into engagement with the door post 7 which is of a construction to provide a housing for the sliding bolts of the locks, to be hereinafter more fully described.

The master lock, by means of which the various door locks of the motor vehicle are controlled, includes a pivoted arm 8 which is actuated by the handle 9 which is of the lock controlled type so that the handle as well as the sliding bolt controlled thereby, may be securely held in their closed or locking positions.

Connected with the pivoted arm 8, is a rod 10 that extends through the right front door 5 and carries the locking pin 11 at its forward end, the locking pin being of a length to extend through the tube 12 and through aligning openings in the rear edge of the door and door jamb as shown by Figure 3 of the drawings, so that when the locking pin is in its locking position, or its position as shown by Figure 3, it will be impossible to swing the door to its open position. The free end of the locking pin 11 extends into the tube 13 that is secured adjacent to the aligning openings between the door and frame. Mounted within the tube 13 is a plunger 14 that is normally urged towards the locking pin 11, by means of the coiled spring 15 which is also mounted in the tube 13. The action of the spring 15 is such that when the locking pin 11 is moved to its inactive position, the free end of the plunger 14 will be moved to a point adjacent to the aligning openings of the door and frame, pushing the locking pin 11 from the aligning openings.

Connected with the plunger 14 is a wire 16 that passes through the tube 17, the wire being connected with the pivoted latch 18 mounted adjacent to the front end of the hood, the pivoted latch being of a construction to engage the member 19 of the hood lock 20, which in the present showing is in the form of a hood ornament.

From the foregoing it will be seen that when the wire 16 is pulled, by the action of the coiled spring exerting a force against the plunger 14, the latch member 18 will be moved to disengage the member 19, allowing the hood to be lifted.

The sliding bolt of the master lock is indicated by the reference character 21, and as shown moves through aligning openings in the rear edge of the door and front edge of the door post 7, the sliding bolt being of a length to extend to a point adjacent to the opposite edge of the door post 7, where it is engaged by the arm 22 which is pivotally mounted within the door post, at 23. The end 24 of the arm 22 extends rearwardly, and one end of the coiled spring 25, is connected to the free end of the end 24 of the arm 22. The opposite end of the spring 25 is secured within the door post 7, at 26 so that when the sliding bolt 21 is in its locking position, the arm 22 will be moved to tension the spring 25. It is obvious that when the bolt 21 is free to move rearwardly, the coiled spring 25 will exert a pressure on the sliding bolt 21 to assist in moving the bolt 21 free of the aligning openings of the door and door post, allowing the door to open.

The spring 25 also exerts a pull on the lower end 27 of the arm 28, which is pivotally mounted within the door post, at 29. The upper end of the arm 28 has connection with the sliding bolt 30 that moves through aligning openings in one side of the door post 7, and rear right door of the vehicle, with the result that when the sliding bolt 30 is in the position as shown by Figure 5, the rear right door will be secured in its locked position.

The reference character 31 designates a tubular housing which is mounted within the frame of the motor vehicle, and extends upwardly through the door posts, and across the top of the car where it is concealed between the roof and inner covering of the roof of the car. Operating within the tube 31 is a wire 32 that has connection with the end 24 of the arm 22 at one of its ends, the opposite end thereof being connected with the pivoted arm 33 that is mounted within the door post 34 against which the left rear door 35 and left front door 36 engage.

One end of the pivoted arm 33 engages the upper end 37 of the arm 38, which is pivotally mounted on the bar 39 supported within the door post 34. The arm 38 is connected to the sliding bolt 40 that moves through aligning openings in the side of the door post 34 and left front door of the vehicle. A coiled spring indicated at 41 operates to normally urge the sliding bolt to its locking position. The sliding bolt 40 moves in the guide 42 which is secured within the door post 34, as clearly shown by Figure 10.

The sliding bolt 43 of the left rear door lock, is connected with the lower end of the arm 38, and is normally urged to its closed position by means of the spring 44 which is mounted within the bolt housing 45, as shown by Figure 11. Thus it will be seen that due to this construction, the sliding bolts 40 and 43 are normally urged to their locking positions.

The reference character 44' designates a coiled spring that is mounted within the door post 34 and has connection with the upper end 37 of the arm 38, normally urging the upper end of the arm 38 inwardly. The operation of the locking mechanism is as follows. Should it be desired to unlock the various doors of the motor vehicle, when the locks are in their positions as shown by the drawings, it is only necessary to insert the required key in the master lock. The handle 9 may now be operated to withdraw the sliding bolt 21 of the master lock from the keeper openings. As the sliding bolt moves inwardly, the coiled spring 25 acts to move the lower end 24 of the arm 22 upwardly. This movement causes the arm 33 at the other side of the vehicle to move downwardly. As the arm 33 moves downwardly, the arm 38 will swing under the action of the coiled spring 44' which overcomes the action of the springs 41 and 44 of the sliding bolts. The sliding bolts are now moved to their unlocked positions.

When the operating handle of the master lock is moved to lock the vehicle doors, it is obvious that the movement of the sliding bolts and operating mechanism will be in the reverse direction, allowing the bolts to move into their keepers.

What is claimed is:

Locks for doors on opposite sides of a motor vehicle, said locks comprising sliding spring bolts adapted to lock the doors in their closed positions, pivoted arms connected with said sliding bolts, a master lock including a sliding bolt, a pivoted arm mounted within the body of the car and moved by the action of the bolt of the master lock, one of said spring bolts being connected with the last mentioned pivoted arm and the spring thereof being tensioned when the master bolt is moved to its active position, a flexible connecting member connecting the pivoted arms and sliding bolts at opposite sides of the automobile body and having connection with the pivoted arm operated by the bolt of the master lock, whereby the sliding bolts of the locks are operated simultaneously with the operation of the master lock.

AUGUSTIN M. ARRIZABALA.